United States Patent
Carson et al.

(10) Patent No.: US 7,127,455 B2
(45) Date of Patent: Oct. 24, 2006

(54) TAXONOMY FOR MOBILE E-SERVICES

(75) Inventors: Carollyn Carson, Bayonne, NJ (US); Ian Rhodes, Espoo (FI); Roberto Sanchez, Vallejo, CA (US); Gerald Winsor, San Jose, CA (US); Christopher Peltz, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 10/292,199

(22) Filed: Nov. 12, 2002

(65) Prior Publication Data
US 2004/0093326 A1    May 13, 2004

(51) Int. Cl.
*G06F 7/00* (2006.01)
*G06F 15/16* (2006.01)
*H04Q 7/20* (2006.01)

(52) U.S. Cl. .................. 707/3; 709/219; 455/414.1
(58) Field of Classification Search .......... 455/414.1; 709/219, 227; 707/3, 10, 100, 104.1
See application file for complete search history.

(56) References Cited

U.S. PATENT DOCUMENTS 6,778,836 B1 * 8/2004 Kawakami .......... 455/456.1
6,782,259 B1 * 8/2004 Bamburak et al. ........ 455/434
2003/0036401 A1 * 2/2003 Leppa et al. ............ 455/517
2003/0120817 A1 * 6/2003 Ott et al. ................. 709/249

OTHER PUBLICATIONS

U.S. Appl. No. 10/292,200, C. Carson, et al.
U.S. Appl. No. 10/292,196, C. Carson, et al.
U.S. Appl. No. 10/093,691, Scott L. Williams

* cited by examiner

*Primary Examiner*—Sam Rimell
*Assistant Examiner*—Rezwanul Mahmood

(57) ABSTRACT

A taxonomy is disclosed for describing mobile electronic services (MES) comprising a tree structure for organizing descriptive characteristics of the MES, wherein the tree structure includes: a root level for identifying an environment to which the MES is directed; a service model level for identifying a plurality of service categories; an entity level for identifying a plurality of accessing entity categories; a platform level for identifying a plurality of available component platforms; a class level for identifying a plurality of application characteristics; and an application level for identifying a plurality of specific MES applications; and metadata for identifying additional information relevant to selection of the MES.

19 Claims, 6 Drawing Sheets

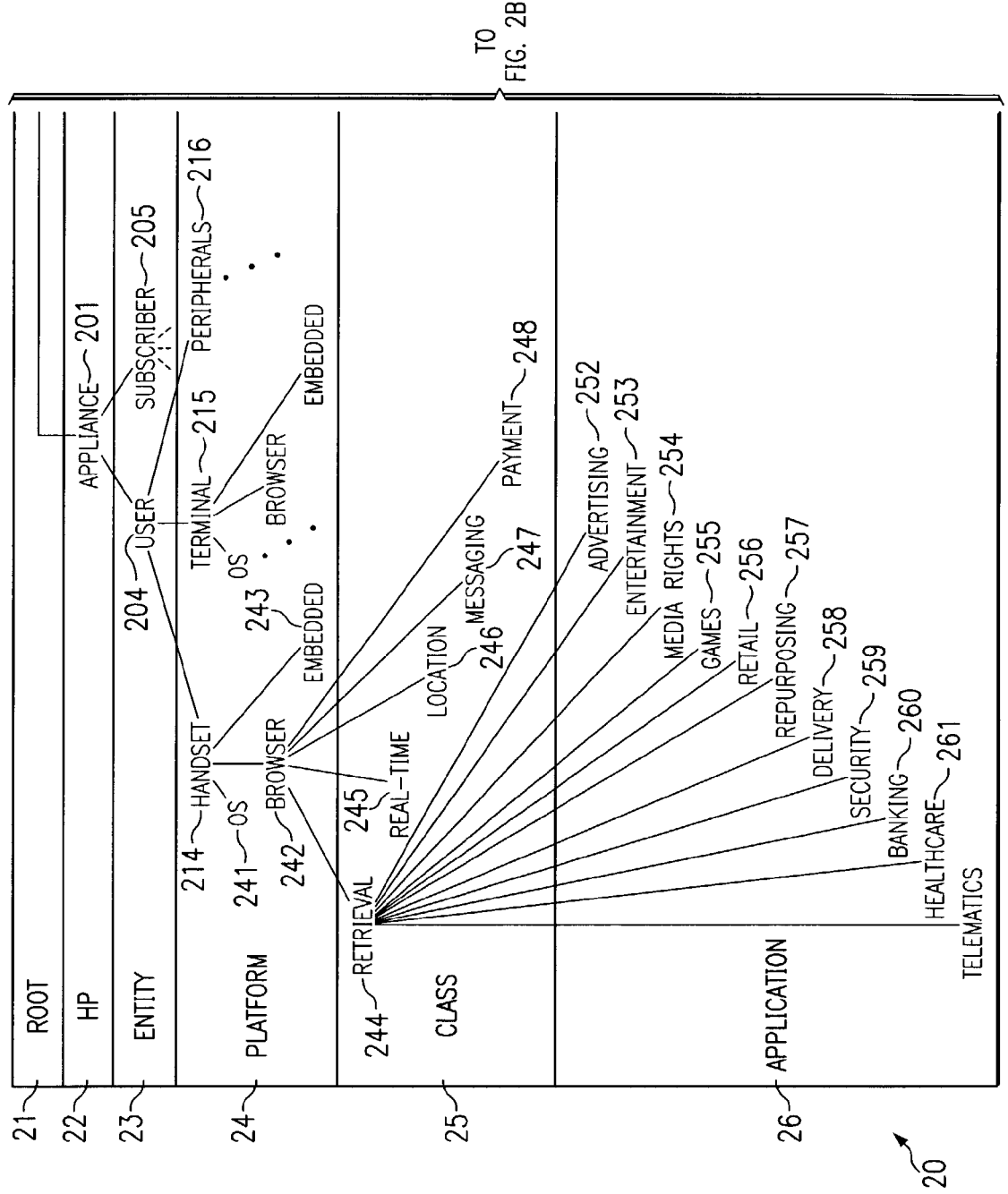

FIG. 3

```
     ┌─────────────────────┐
     │ 01-Mobile E-Service │
     │ 02-Infrastructure   │
30 ──┤ 04-Service Provider │
     │ 06-Gateway          │
     │ 04-Messaging        │
     │ 01-Advertising      │
     └─────────────────────┘
              ⋮

<serviceDesignator>01.02.04.06.04.01</serviceDesignator> ⟵ 300
                        ⎵⎵⎵⎵⎵⎵⎵⎵⎵⎵⎵⎵⎵
                              307
              ⋮

<businessEntity> ⟵ 301
              ⋮
                              309      308
                              ⎴⎴⎴   ⎴⎴⎴⎴⎴⎴⎴
     <registration organization='FTRN'>1548935-5</registration> ⟵ 302
              : 310
              ⋮ /
     <rating>4</rating> ⟵ 303
              ⋮
31 ⎨ </businessEntity>
              ⋮

<businessService> ⟵ 304
              ⋮
     <revenueModel>LICENSING</revenueModel> ⟵ 305
                   ⎵⎵⎵⎵⎵⎵⎵⎵
                      311
              ⋮
     <rating>4</rating> ⟵ 306
              \
              : 312
     </businessService>
```

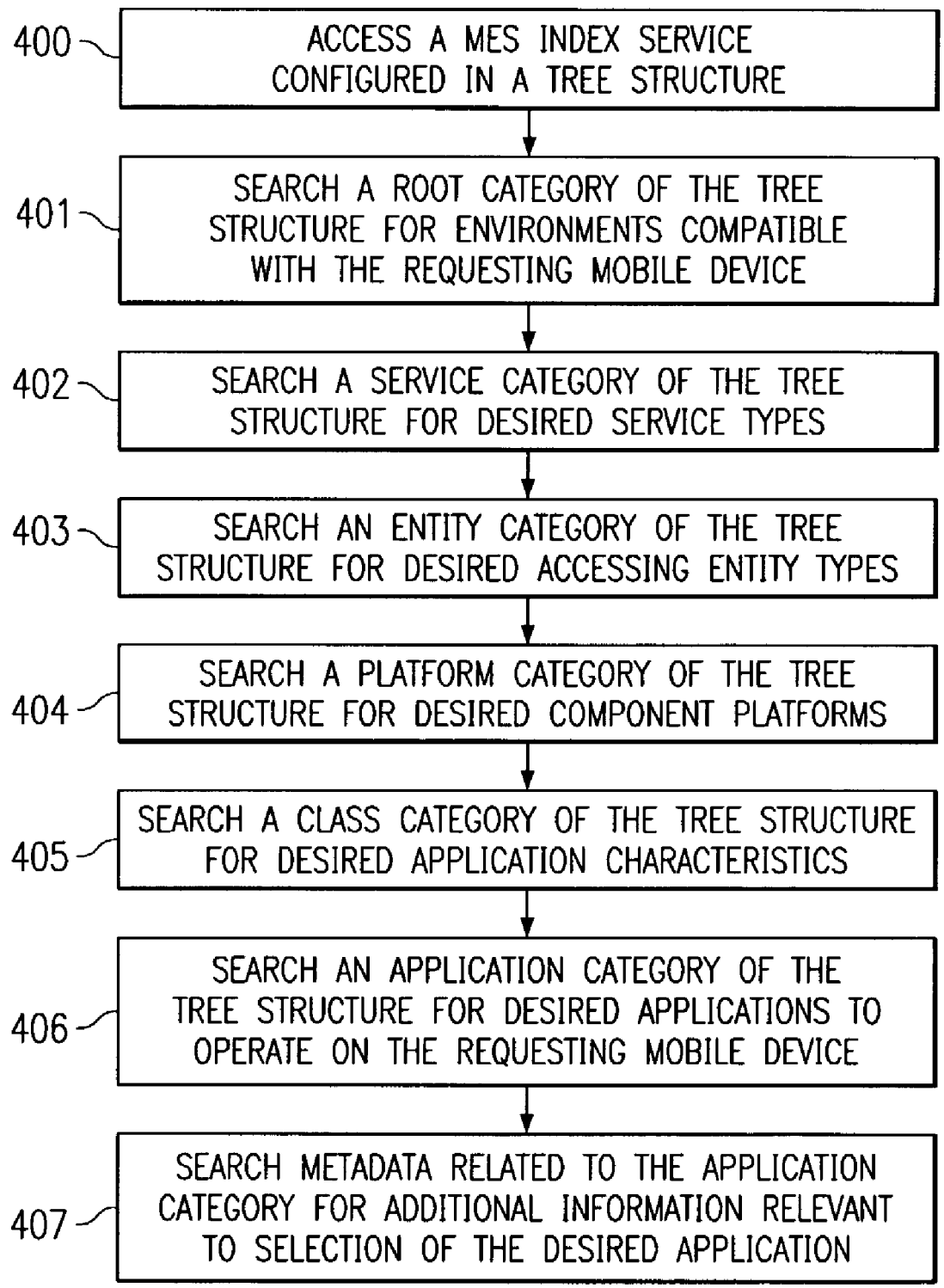

TAXONOMY FOR MOBILE E-SERVICES

CROSS-REFERENCE TO RELATED APPLICATIONS

This application is related to [concurrently filed and] commonly assigned U.S. patent application Ser. No. 10/292,200 entitled "A SYSTEM AND METHODOLOGY FOR MOBILE E-SERVICES, and [concurrently filed and] commonly assigned U.S. patent application Ser. No. 10/292,196 entitled "A SYSTEM AND METHODOLOGY FOR MOBILE E-SERVICES", the disclosures of which is hereby incorporated herein by reference.

BACKGROUND

The Internet has expanded at an incredible pace since originating as a means for scientists to exchange data. Faster access speeds increased the number of Internet subscribers; more subscribers drove businesses to increase their presence on the Internet; more business presence increased subscribers demands to actually do something useful on the Internet; and the demand to provide useful applications not only drove the further increased access speeds, but also the further increase both of the number of subscribers and of the business presence in the global electronic market (e-market). The new step in the e-revolution is applying the established Internet model across the mobile environment.

The Universal Description Discovery and Integration (UDDI) specification was developed as an industry initiative for a universal business registry or catalog of web- and e-services. UDDI is designed to enable software to automatically discover and integrate with services on the web. Using a UDDI browser, users can also review the information contained in the registry, which is a network of servers on the Internet similar to the Domain Name System (DNS). UDDI may be analogized to a large electronic phonebook; it typically contains "white pages" (i.e., addresses and contacts), "yellow pages" (i.e., industry classification through taxonomies), and "green pages" (i.e., descriptions of services). The "green pages" will typically include the extensible markup language (XML) version, type of encryption, and a document type definition (DTD) of the standard. UDDI messages will typically ride on top of the simple object access protocol (SOAP), which invokes services on the web.

Web-and e-services may register with a UDDI operator. Once registered, others can discover and use the registered services by accessing one or more of the UDDI registries. UDDI allows for complete control over describing, categorizing, and registering the web-or e-service via taxonomies and other extensible information. A taxonomy, in general, is a classification system of any set of organisms. In the Internet context, a taxonomy is generally known as a classification scheme or categorization of websites, and/or web- or e-services into a hierarchy for searching purposes.

UDDI supports taxonomies as a means for reifying and organizing the mass of information and data deposited in to the registry. UDDI allows users to define multiple taxonomies that may be used within UDDI. In such a manner, multiple taxonomies may be overlaid on a single UDDI entity. The taxonomy is a metadata description of the web-or e-service that facilitates the organization of the information as a hierarchical tree structure. This allows for a metadata-based search, which produces more relevant matches than a typical string search. A taxonomy is used to define a coherent description of services. The specific taxonomy used to register the service is the same used to discover the service. For this reason, the taxonomy should be descriptive and robust enough to represent services within a particular class of service.

Currently, UDDI supports several different standard taxonomies for business and commodity classification. Universal Standard Products and Services Classification (UNSPSC) is a taxonomy that classifies and identifies commodities. The work includes identifiers, hierarchical classifications, titles, definitions, and version control information. See http://eccma.org/unspsc/. Standard Industrial Classification (SIC) was originally developed in the 1930's to classify establishments by the type of activity in which they were primarily engaged. The SIC system uses a 4-digit code to identify its classifications. However, as the economic world changed SIC came under criticism, which lead to the development of the North American Industry Classification System (NAICS). See http://www.naics.com/info.htm/. NAICS is a 6-digit code identifier which focuses on a production-oriented, or supply-based conceptual framework. Its intent is to give special attention to developing production-oriented classification. ISO 3166 is a Geographic Code System, which provides a domain of values used to provide geographic categorization of businesses and services within the UDDI registry. See http://www.iso.ch/iso/en/prods-services/iso3166ma/.

UDDI also currently supports other business-oriented identification systems such as Dun & Bradstreet's D-U-N-S number identification system. The D-U-N-S number identification system is a unique 9-digit identification sequence that provides unique identifiers of single business entities, while linking corporate family structures together. See http://www.dnb.com/. Thomas Register is also a business-oriented identification system that identifies and classifies many U.S. and Canadian companies and products. See http://www.thomasregister.com/.

Web services (infrastructure services or applications that provide some component or functionality to an overall solution delivered via the Internet) and e-services (the actual overall solution delivered via the Internet that may use several web services) are proliferating across the Internet driving e-commerce and business-to-business (B2B)-commerce. However, with the increase in mobile access devices, new and existing web- and e-services are desired to be delivered over the mobile access networks. Moreover, as the number of such mobile e-services (MES) grows, it becomes important to provide a means of discovering the appropriate service at any given time and for any given location. The increased complexities of real time personalization, not typically found in other traditional Internet e-services, along with the complexities due to the mobile aspect of MES, extends beyond the existing standard taxonomy schemes incorporated into and supported by UDDI.

Much of the Internet discovery and description of services is performed with point-to-point integration. However, point-to-point integration will become less of a viable option when addressing the potential volume and dynamic nature of web-and e-services. MES networks, often referred to as MES ecosystems, may have many services, some appearing and others disappearing at any given time. Managing tightly coupled and point-to-point interfaces for web-and e-services is already costly and prone to breakdowns in in situ Internet applications. The complications only increase with the addition of the mobile aspect to MES delivery.

SUMMARY

Embodiments of the present invention are directed to a system for a taxonomy to describe mobile electronic services (MES) comprising a tree structure for organizing descriptive characteristics of the MES, wherein the tree structure organization includes: a root level for identifying an environment to which the MES is directed; a service model level for identifying a plurality of service categories; an entity level for identifying a plurality of accessing entity categories; a platform level for identifying a plurality of available component platforms; a class level for identifying a plurality of application characteristics; and an application level for identifying a plurality of specific MES applications; and metadata for identifying additional information relevant to selection of the MES.

Additional embodiments of the present invention are directed to a method for searching for mobile electronic services (MES) to operate on a requesting mobile device comprising accessing a MES index service configured in a tree structure, searching a root category of the tree structure for environments compatible with the requesting mobile device, searching a service category of the tree structure for desired service types, searching an entity category of the tree structure for desired accessing entity types, searching a platform category of the tree structure for desired component platforms, searching a class category of the tree structure for desired application characteristics, searching an application category of the tree structure for desired applications to operate on the requesting mobile device, and searching metadata related to the application category for additional information relevant to selection of the desired application.

Further embodiments of the present invention are directed to a system for classifying mobile electronic services (MES) comprising means for assigning a root designator to an environment compatible with a requesting mobile device, means for assigning a service designator for desired service types, means for assigning an entity designator for desired accessing entity types, means for assigning a platform designator of the tree structure for desired component platforms, means for assigning a class designator of the tree structure for desired application characteristics, means for assigning an application designator of the tree structure for desired applications to operate on the requesting mobile device, and, means for assigning metadata related to the application category for additional information relevant to selection of the desired application, and means for saving the classification in a tree structure accessible by the requesting mobile device.

BRIEF DESCRIPTION OF THE DRAWINGS

Reference is now made to the following figures:

FIG. 2A is a graphical depiction of a taxonomy illustrating different exemplary categories and entities;

FIG. 3 is a visual abstraction of an exemplary classification; and

FIG. 4 is a flow chart illustrating steps used for searching for a mobile e-services using an exemplary taxonomy.

DETAILED DESCRIPTION

There are various entities involved in MES provisioning. Many of these entities are already a part of provisioning models found in the mobile industry. A mobile network operator (MNO) typically owns and maintains the physical mobile network in a given geographic location. A service provider is typically a utility provider, such as SPRINT, AT&T WIRELESS, T-MOBILE, and the like, who maintains agreements with the MNO for use of the network to provide service. In some cases, the MNO and service provider may be the same company. A third-party service provider is an entity who wishes to provide MES, but does not wish to have their own agreements with the MNOs. Third-party service providers typically will leverage existing agreements between MNOs and a service provider by selling the service to the service provider. Content providers provide content, but, as with the third-party service provider, do not have separate agreements with an MNO. Content providers sometimes provide service to information/application aggregators who may be service providers or third-party service providers. A subscriber generally maintains a contract with one or more service providers on behalf of one or more users, while a user is typically the end-user or consumer of the service. A user may also be the subscriber, as is the case in many consumer service contracts.

Figure 1A:
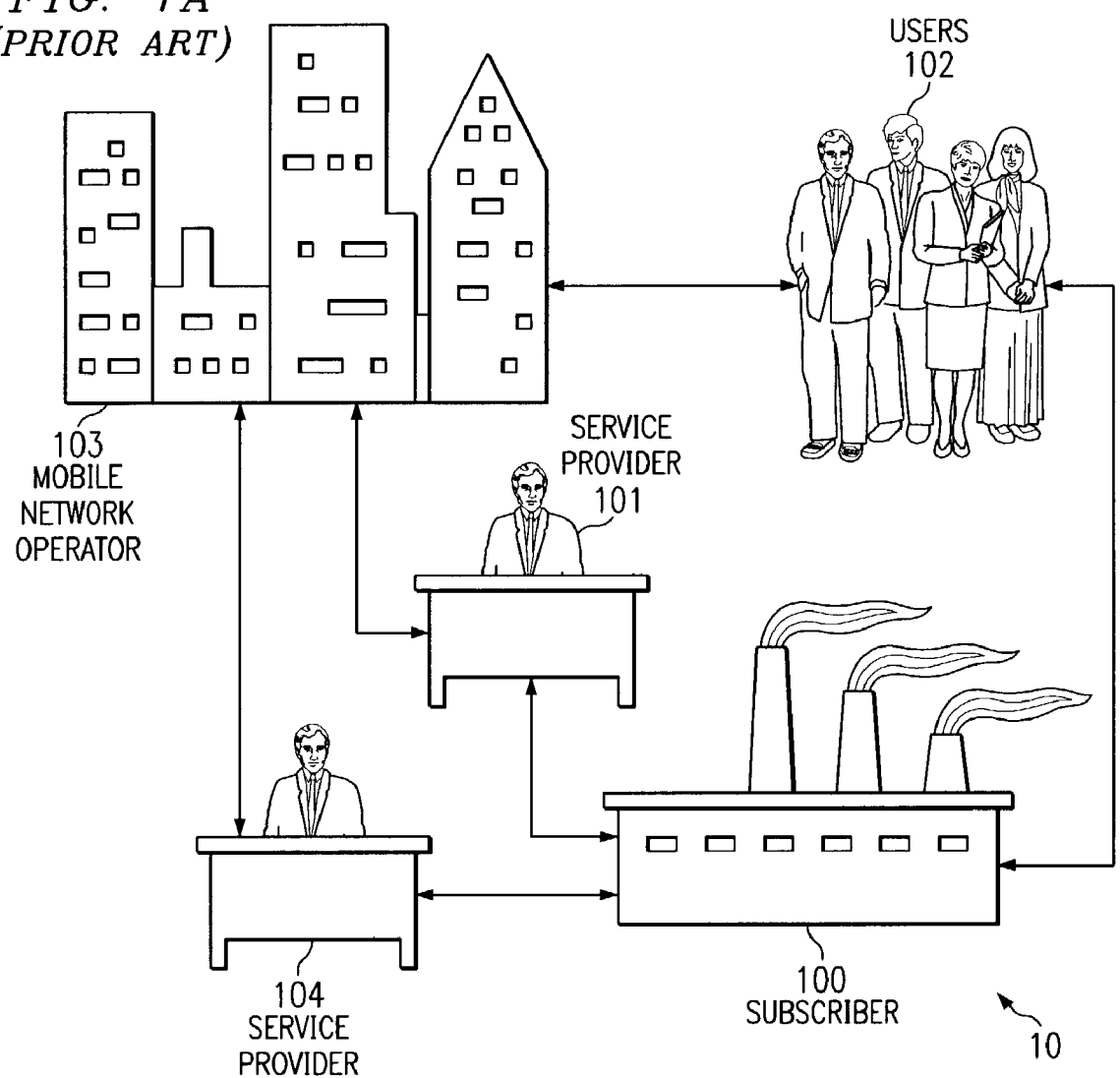
FIG. 1A is a block diagram illustrating the basic subscription model for mobile e-services.

FIG. 1A is a block diagram illustrating the basic subscription model for mobile services. Subscriber 100 typically engages in a contract with service provider 101 on behalf of users 102. If the contract is a consumer agreement for an individual, then user 102 and subscriber 100 may be the same entity. Thus, subscriber 100 is a customer of service provider 101. In some embodiments, subscriber 100 may have contracts with additional service providers, such as service provider 104, for different varieties of services or for the same service over different geographic areas. Service provider 101 generally owns the relationship with subscriber 100 and is usually responsible for billing, managing, and customer care. However, subscriber 100 is generally responsible for determining the services provided to user 102. MNO 103, who typically contracts with service providers 101 and 104, actually provides the service to user 102 at the point of execution. Therefore, the service is delivered to user 102's mobile device by service providers 101 and/or 104 through MNO 103. MNO 103, acting as a service provider, may also make its services available in a private registry to be discovered and utilized by service providers 101 and 104.

Figure 1B:
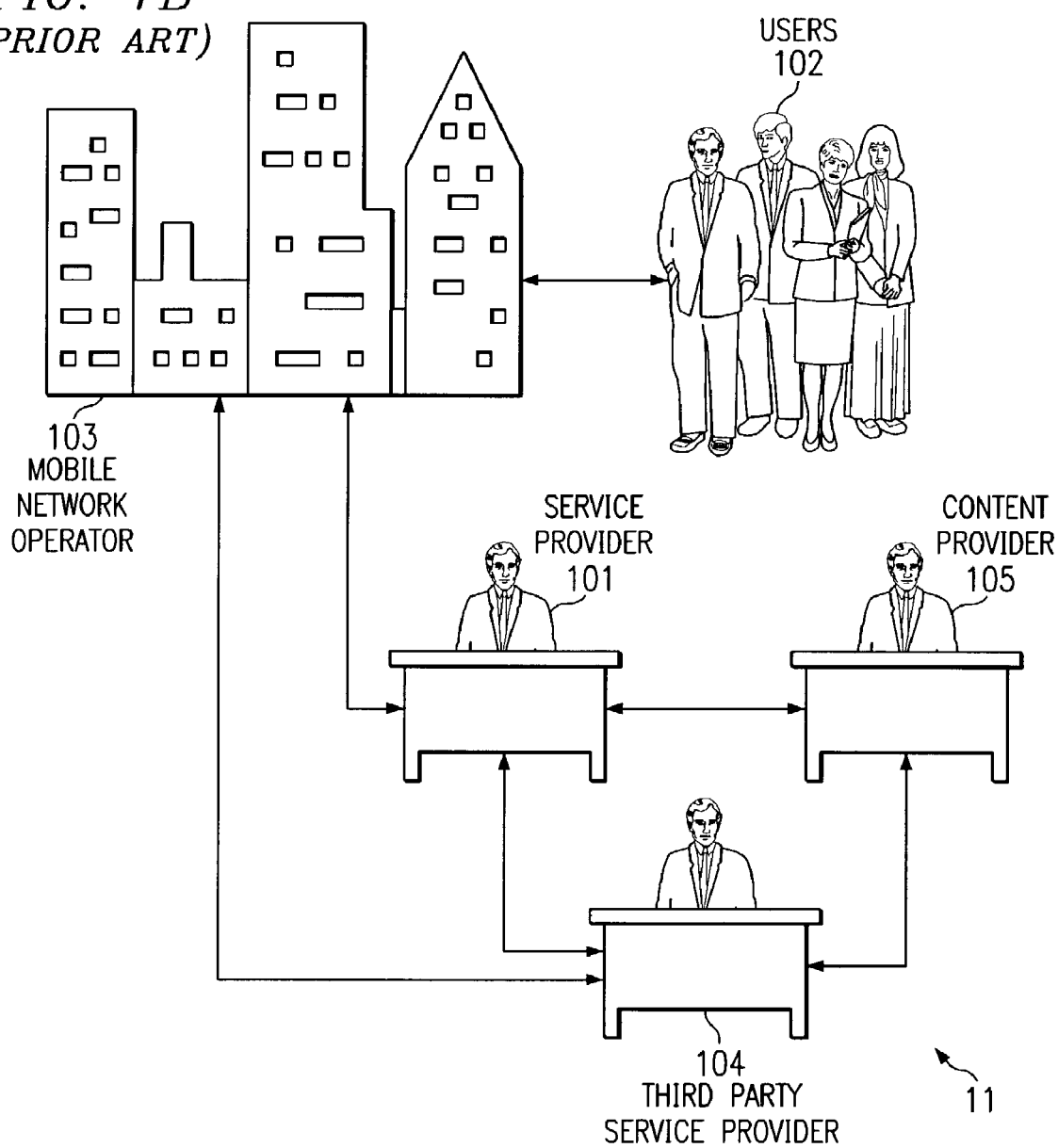
FIG. 1B is a block diagram illustrating the subscription model for mobile e-services using third-party service providers and/or content providers.

FIG. 1B is a block diagram illustrating the subscription model for mobile services using third-party service providers and/or content providers. Here, service provider 101 may access applications or services from third-party service provider 104 and/or content provider 105 to provide additional services and/or information in the services delivered to users 102 through MNO 103. Additionally, third-party service provider 104 and content provider 105 may also access each others applications or services to provide additional services or information in their respective products. Currently, third-party service provider 104 and content provider 105 may make their services available in public and/or private UDDI service registries. This generally allows their services to be discovered by service provider 101, who, in turn, may offer those services to subscriber 100 as a part of a broader service-set. MNO 103, acting as a service provider, may also make its services available in a private registry to be discovered and utilized by service providers 101 and 104.

Many MES ecosystems are hosted environments that provide a collection of functionality that is of value to a selected mobile audience. These ecosystems are typically a collection of software, tools, infrastructure services and web/e-services that address the mobile industry segment. As MES ecosystems continue to grow in number, many enterprise-class ecosystems may provide the underlying management, security, monitoring, and support for web-and e-services found within them. However, for MES to be of value to enterprise-class customers, various services should be supported through interfaces that are comprehensive and flexible enough to account for the wide variety of potential users and their infrastructure needs.

Figure 2B:
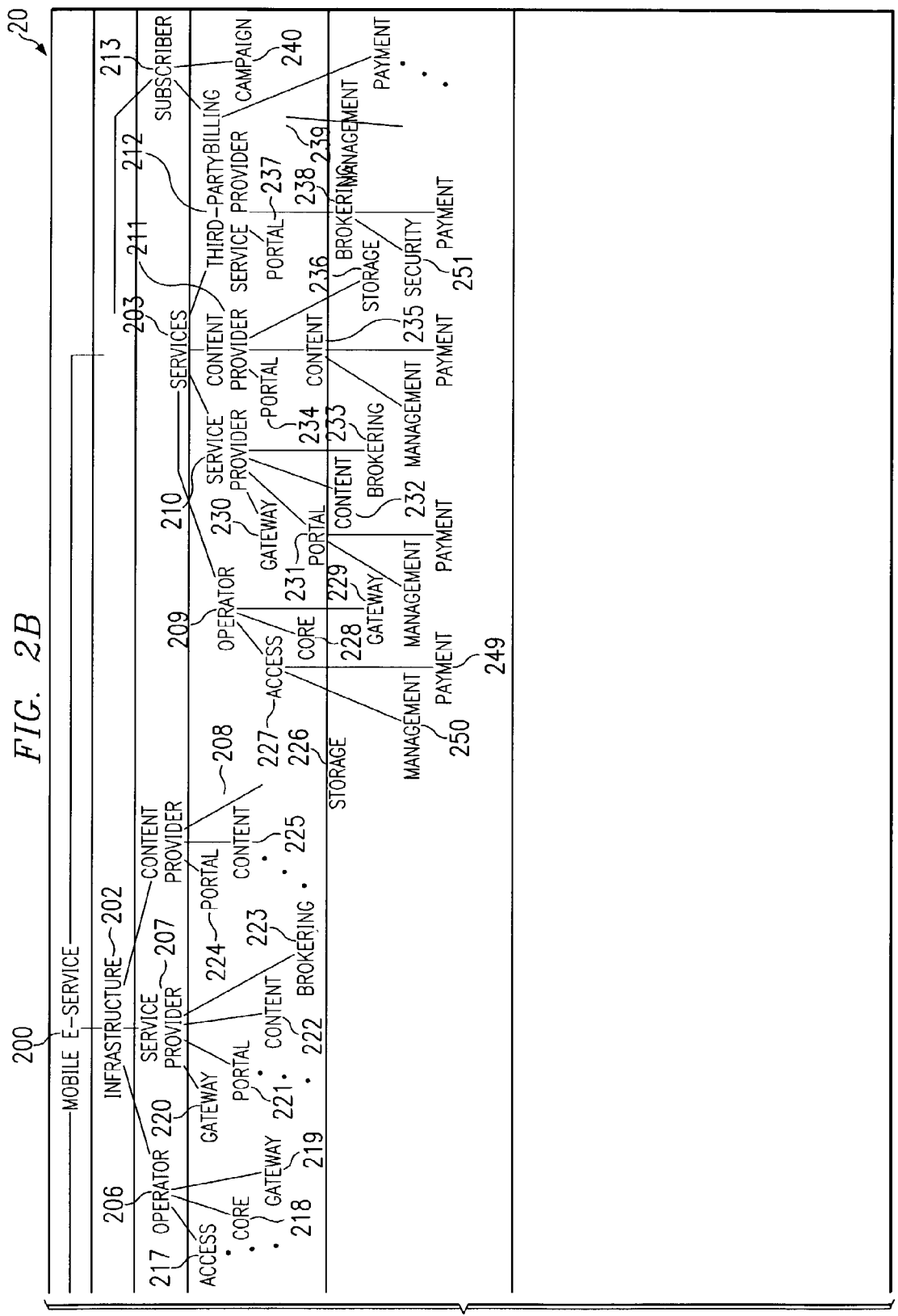
FIG. 2B is a graphical depiction continuing the taxonomy illustrated in FIG. 2A.

FIGS. 2A and 2B are graphical depictions of a taxonomy defined according to the teachings of an embodiment of the present invention. A trait of a well-defined taxonomy is that the higher levels of the hierarchy are preferably more invariant. This implies that when the repositioning of a service needs to take place, such as when it addresses another market segment, it preferably does not require large traversals of taxonomy tree 20. Further, by keeping the most variable aspects, usually categorized by specialization, towards the edges of the tree, it is easy to customize and extend the taxonomy without redrafting the hierarchy. This will preferably allow the taxonomy to represent current generations of MES and allow for extensions to accommodate future generations of MES.

Taxonomy tree 20 is preferably divided into categories or levels containing further divisions of entities and/or descriptors. Using these categories and entities, a means is provided for generating a description of any selected service. Root identifier 21 preferably identifies the taxonomy as representing a certain environment-directed service. The root identifier, shown in FIG. 2B, is mobile e-services 200, which identifies taxonomy tree 20 as a taxonomy representing e-services for mobile environments. Service Model (SM) category 22 (FIG. 2A) identifies a concept focusing on a model that provides three relevant service areas: always-on mobile infrastructure, e-services, and information appliances. This model illustrates the versatility of MES. It should be noted that SM category 22 may represent any provider's MES. One specific, non-limiting example is HP MES provided by Hewlett-Packard Company. Another non-limiting example is Sonera SmartTrust Ltd.'s MES. Specific features of the HP MES are described below as exemplary features of one embodiment of a MES.

Entity category 23 preferably represents the fundamental roles in delivering MES. MES provisioners would typically model one or more of these entities. Each role in entity category 23 preferably spans multiple components with a platform as a part of a MES solution. A MES may provide functionality targeted to a specific area of a mobile architecture such as gateway translations, a subscriber platform, such as billing, or require a specific platform to operate on, such as a Java Virtual Machine (JMV) on a general packet radio service (GPRS) enabled mobile handset. Platform category 24 represents each specific platform for which the MES is targeted.

Within class category 25, characteristics of a service are preferably represented. The actual implementation is characterized within platform category 24. A user may wish to receive the same service across all devices and access networks, which would imply traversing taxonomy tree 20 (FIG. 2B) as high as platform category 24 (FIG. 2A) and back down to find the appropriate services. Application category 26 preferably represents the most visible part of MES provisioning. Application category 26 is where the "customization" of services is represented when addressing a particular market or customer segment. Application category 26 is subject to much reinterpretation. Since this classification is at the edge of taxonomy tree 20 (FIG. 2B), it preferably allows maximum flexibility in server description without impacting higher layers/categories in the hierarchy, which would prevent the repositioning of other services.

In SM category 22 (FIG. 2A), appliance entity 201 preferably defines the appliances suitable for using the MES. Services are run on the client-side using devices such as information appliances and wireless handsets. Embedded software, creating peer-to-peer or web service interactions enable these services. As appliances and technology matures, it is anticipated that they will not only consume services, but will host services as well.

Services 203 aligned appliance entity 201 have services that run on the client with no dependencies on infrastructure and are standalone. The service is delivered from the client. One example of this is the use of a CHAI-enabled printer. CHAI is an embedded software technology from Hewlett-Packard Company that supports intelligent interaction among information appliances through the use of the JAVA programming language and other web standards. In this example, the client would be the printer and the services aligned appliance entity 201 would be the CHAI modules that provide services to the printer.

Infrastructure entity 202 (FIG. 2B) preferably defines the infrastructure assets that enable MES delivery. Services found under this branch of the taxonomy are generally not mobile end-user e-services, but enable mobile end-user e-services. A MNO or a service provider who has a relationship with the MNO typically supply infrastructure services. Many of these services are derived from network equipment or enabled directly by network capabilities. An example of such infrastructure services would be a service providing location coordinates of a mobile device through triangulation.

Service entity 203 may be where much of the third-party service provider services are found. These services typically use a service provider and a MNO to deliver the service, as well as infrastructure services, such as gateways. Services may be delivered through other third-party service providers or service aggregators as well. An example of a service in this branch is a location service. This service generally submits a mobile number to an infrastructure service and interprets the results into Global Positioning System (GPS) coordinates.

Each entity under Entity category 23 (FIG. 2A) preferably indicates which branch or branches of the SM service category they are aligned with and represent. User 204 is generally found under Appliance branch 201 and refers to the user of the appliance requesting the service or where the user's appliance is hosting the service.

A user may be an individual or a thing, as is found with a tracking service. For example, a trucking organization may use a GPS tracking device on their trucks to send information over a wireless network to a tracking application. In this case, the truck would provide information to a remote service. It may also host a web service as is the case when a driver has reached the legal limit for time driven within a 24 hour period and an indicator or alarm is issued.

Subscriber 205 is generally found under appliance 201 and services 203 (FIG. 2B) branches of the SM service model. An "appliance" subscriber refers to a service or individual that subscribes to something but does not use network services. The subscriber can be the individual who has the contract with the service provider for mobile service. The subscriber typically determines which services or service-sets they are willing to pay for. As a result of this agreement with the service provider, a specific service-set is available on the mobile device via the service provider.

Services 203 subscriber 213 subscribes to various services from a service provider and third-party service provider. These subscriber services may set up agreements for use of various services from a variety of providers. Service aggregators may also provide subscriber services. In this case, the service aggregator bills their subscribers for services consumed then pays the service provider.

Operator 206 may be found under two branches of the SM service model, infrastructure 202 and services 203. In both cases, operator 206 is the owner of the network, and is referred to as the MNO. Infrastructure operator 206 provides services that are derived directly from the network equipment or software, such as the location service example provided above. Services operator 209 provides services that interface with an infrastructure service. An example of this may be a location engine within the MNO site that interfaces with the location infrastructure service and provides GPS coordinates to subscribers.

Service provider 207 may be found under infrastructure 202 and services 203 branches of the SM service model. Service provider 207 is typically a utility provider who owns the relationship with the subscriber. A service provider generally delivers the service to the user through an MNO. The user is the recipient of the service. The subscriber usually has established a service contract with the service provider and typically dictates the services to be made available to the user. This is frequently the case when companies (Subscriber) provide mobile services to their employees (User).

A service provider may provide infrastructure web services that interact with the MNO's network to provide information. These types of services are not necessarily directly consumable by a user. An example is customer billing, where the billing information required by the service provider to bill the subscriber is gathered at the MNO's gateway.

A service provider may also provide services that are not related to the infrastructure. Since the service provider owns the relationship with the customer or subscriber (i.e., controls the relationship by contract or other means), services can be offered leveraging that advantage. These services are ready for consumption by a user or may be integrated with other services to provide more value. For example, a digital photo album service may be offered providing storage for photographs transmitted over a mobile network, or an entertainment service can be provided to broker the best video service at any given time while deducting the costs (in the form of micropayments) for that service from an account. A service provider may also bind to and invoke other services from such entities as third-party service provider 212 and content provider 208 and 211.

Content provider 211 may be found under infrastructure 202 and services 203 branch of the SM service model. Content provider 211 generally provides content in some form. Infrastructure content provider 208 provides content in a programmatic format. An example of this type of service is a news syndication service where the information is transported as an XML document. Services content provider 211 provides content that is viewable by a user. This type of content provider may transmit information as hypertext markup language (html), display content as part of a portal, or have news items rendered from an XML format for display on a variety of devices.

Third-party service provider 212 may be part of the services branch 203 of the SM service model. Third-party service provider 212 does not generally "own" the customer, or have agreements with MNOs. Services are typically provided via a service provider that owns the relationship with the subscriber. These services are consumable by users or can be composed with other services to provide more value. Third-party service provider 212 is responsible for hosting the service and makes it available via Internet protocols. A service provider is responsible for binding to and invoking the service from third-party service provider 212 for delivery to a user.

Platform entity 24 describes many different entities that are used or possible as platforms. Although FIGS. 2A and 2B depict several entities within platform entity 24, this list is only representative and should not be interpreted as a limitation.

Handset 214 (FIG. 2A) may be found under appliance branch 201. It is also represented under user 204 and subscriber 205 entities. Each handset 214 preferably has the additional level of operating system (OS) 241, browser 242, and embedded 243, which refers to embedded software. Handset 214 indicates the type of appliance. Handset 214 typically has limited screen real estate, computing power, and storage capacity. Applications loaded and executed from a handset must take these limitations into account. Handset 214 describes mobile handheld devices such as phones and PDAs.

Terminal entity 215 may be found under the SM service branch of appliances. It is also represented under user 204 and subscriber 205. Each terminal entity 215 preferably has the additional level of OS 241, browser 242, and embedded 243, which refers to embedded software. Terminal entity 215 represents larger capacity machines such as PCs as well as dumb terminals. PCs and laptops have more screen real estate, computing power, and storage capacity than handsets. Dumb terminals or thin clients typically have the screen real estate, but have much less computing power and storage capacity than PCs and laptops.

Peripheral entity 216 may be found under the SM service branch of appliances. It is also represented under user 204 and subscriber 205. Each peripheral entity 216 preferably has the additional level of OS 241, browser 242, and embedded 243, which refers to embedded software. Peripheral entity 216 represents smart appliances, such as an Internet-enabled projector or CHAI-enabled printer. These devices have little to no screen real estate for displaying selections or entering commands. They may have more storage capacity and computing power than a handheld, but less than a terminal device.

Access entity 217 (FIG. 2B) may be found under infrastructure 202 and services 203 branch of the SM service model. Within these branches, access is associated with operator 206 and 209 at entity level 23 (FIG. 2A). Access 217(FIG. 2B) is preferably described as part of a partitioning of the mobile network by Third-Generation Partnership Project (3GPP). A network operator may provide access to a certain type of network, such as a radio access network. This is in contrast to a network provider that operates a core network. Infrastructure access 217 preferably indicates access services that are provided by the network operator. These access services may require special gateways, equipment or software to be present on the network to operate. Services access 227 is preferably a service that is not tied to an infrastructure. An example of this is access management, such as device monitoring or authentication.

Core entity 218 may be found under infrastructure 202 and services 203 branch of the SM service model. Within these branches, access is associated with operator 206 and 209 at entity level 23 (FIG. 2A). Core entity 218 (FIG. 2B) is preferably described as part of a partitioning of the mobile network by 3GPP. A network provider operates a core network and provides core services. Core services are not necessarily IP services, but can also be switched services such as trunk switches and transmission networks. The core network knows nothing about mobility management or radio resources and mobile traffic is often shared with fixed traffic. This is in contrast to a network operator who may provide access to a certain type of network, such as a radio access network. Services core 228 service is typically not tied to infrastructure, such as back-up and certification.

Gateway entity 219 may be found under the infrastructure 202 and services 203 branch of the SM service model. Within these branches, gateway entity 219 is associated with operator 206 and 209 and service provider 207 and 210 at entity level 23. Infrastructure gateway entity 229 provided by operator 206 describes a service that transforms information from the network to another format and vise versa by extracting it from the network. An example of this is a Multimedia Service (MMS) gateway which formats multimedia Short Message Service (SMS) messages for delivery to MMS enabled handsets or terminals. Infrastructure gateway entity 220 provided by service provider 207 is a service that interfaces with infrastructure gateway 220, accepting input and transforming it into another format for use by another service. Service gateway 228 provided by operator 209, interfaces with the network to extract information and renders that information in a format that is consumable by another service. Service gateway 230 provided by a service provider is a gateway service that results in deliverable content to a user. An example is a SMS text message that is delivered to a handheld device.

Portal entity 221 may be found under infrastructure 202 and services 203 branch of the SM service model. Within these branches, portal 221 is associated with service provider 207 and 210, content provider 208 and 211, and third-party service provider 212 at entity level 23 (FIG. 2A). Infrastructures portal entity 221 (FIG. 2b) service provided by service provider 207 provides a service as part of a solution, such as a service delivered via a portal with a programmatic interface. Infrastructures portal entity 224 service provided by content provider 208 will transmit content as part of a solution, such as delivering content via a programmatic interface or XML. Services portal 231 service provided by service provider 210 delivers a service that is consumable by the user, such as a mobile portal interface viewable via a browser on a mobile phone. Services portal 234 service provided by content provider 211 provides a service that delivers content, which is viewable by a user. Service portal 237 service provided by third-party service provider 212 provides portal services as part of a solution, which is viewable by a user.

Content entity 222 may be found under infrastructure 202 and services 203 branches of the SM service model. Within these branches, content 222 is associated with service provider 207 and 210, content provider 208 and 211, and third-party service provider 212 at entity level 23. Infrastructure content 222 service provided by service provider 207 that transmits content as part of a solution via a programmatic interface or XML. Infrastructure content 225 service provided by content provider 208 that transmits content as part of a solution via a programmatic interface or XML. Services content 232 service provided by service provider 210 delivers content that is viewable by the user. Services content 235 service preferably provided by content provider 211 delivers content that is viewable by a user. An example is a news service that sends content when a request is made. Services content 235 service provided by third-party service provider 212 preferably delivers content as part of a solution, which is viewable by a user or another service. An example may be a service that translates GPS coordinates into vertical (V) and horizontal (H) coordinates for use by a mapping service.

Brokering entity 223 may be found under infrastructure 202 and services 203 branch of the SM service model. Within these branches, brokering 223 is associated with service provider 207 and 210 and third-party service provider 212 at entity level 23 (FIG. 2A). Infrastructure brokering 223 (FIG. 2B) service provided by a service provider 207 preferably gives users with the ability to access certain services based upon constraint matching. The brokering may preferably be driven from a user profile, service provider 207 rules, a subscriber's rules or a combination of all of them. For example, a game brokering service may use a user's profile request for free games only, service provider 207 request for nonviolent games only, and a subscriber's rules for game playing after 5 PM and on weekends. All of these constraints ultimately deliver the user with a game list that is typically appropriate for that given moment. Services brokering 223 service provided by service provider 210 searches for or discovers a service that is delivered to the user and is directly viewable or useable. This brokering service may also allow the discovery of user services provided by service provider 210 as well as services provided externally from content and third-party service providers. Services brokering 238 service provided by third-party service provider 212 provides brokering as part of a solution.

Storage entity 226 may be found under infrastructure 202 and services 203 branch of the SM service model. Within these branches, storage entity 226 is associated with content provider 208 and 211 at entity level 23 (FIG. 2A). Infrastructure storage 226 (FIG. 2B) service preferably provides storage as part of an infrastructure service within an overall solution. For example, content provider 208 offers the ability to store online digital images. A digital photography printing service may offer content provider 208's storage service to enhance the offering. Services storage 236 service delivers content that is viewable by a user. For example, a digital store service allows a user to store images and retrieves them.

Billing entity 239 may be found under the services branch 203 of the SM service model. Within this branch, billing entity 239 is associated with subscriber 213 at the entity level 23. Billing entity 239 is a subscriber-based service that preferably allows charges to be applied by subscriber. If the subscriber is a corporation, a billing service may itemize the user accounts Campaign entity 240 is found under the services branch 203 of the SM service model. Within this branch, campaign entity 240 is associated with subscriber 213 at the entity level 23 (FIG. 2A). Campaign entity 240 (FIG. 2B) service does not require a subscription to it, but is frequently used by service provider 210 to generate further non-subscriber revenue from its subscription base. Campaigns 210 can be targeted to groups or by location. Campaigns 210 can also be provided to a consenting, anonymous party.

As the bottom of taxonomy tree 20 is reached, there is more latitude for specialization of service descriptions. Each of class entities 25 (FIG. 2A) described here may have relevance in each of the nodes found in platform category. Class entities 25 will be described in general terms, providing some branch-specific clarification where needed.

Retrieval entity 244 describes services that retrieve information, data or services. Retrieval services on an appliance include synchronization software, such as is found in Personal Information Management (PIM) software. Infrastructure retrieval services may preferably retrieve caller ID information from the network or management-relevant data. In services branch 203 (FIG. 2B), retrieval services may preferably refer to various data found in remote databases that are accessible via a service, such as phone listings.

Real-Time services 245 (FIG. 2A) are services where latency matters. Frequently, these services require response times that allow the service to simulate response times that rival a live action. Examples of infrastructure real-time services can be found in telecommunications, with services such as voice or teleconferencing services. Real-time 245 services may also be services that show events as they occur such as a real-time stock ticker service.

Location 246 services are services that retrieve or translate geographic location information into another format. Location-based infrastructure services use the network to retrieve location information, such as the location of a mobile device via triangulation. Location 246 services are not infrastructure dependent, but may take the output from an infrastructure service and translate it into a format for use by a user or another service.

Messaging 247 services will generally store and forward information and are usually event triggered. The information is transmitted in a timely fashion. Infrastructure messaging services include management services where management information is typically sent when an event occurs. Messaging 247 services include MMS and SMS.

Micro-payment and macro-payment services are included in payment 248 and 249 (FIG. 2B) services. These services may also provide the payment interfaces to complete a transaction with a credit company or a bank. There are a variety of management 250 services such as e-service ecosystem management. Security 251 services will provide various levels of security, such as authorization to use a billing service.

Application category 26 (FIG. 2A) contains the leaves of taxonomy tree 20. It is anticipated that as the taxonomy matures, there will be more leaves included to accommodate further specialization of service descriptions. Application 26 entities will be described in generic terms and represent lines of business. It is expected that each entity can be used with any branch of taxonomy tree 20.

Advertising entity 252 represents services providing advertising abilities over the mobile network. Advertising 252 services may be delivered as a service to complement a larger solution or as a service deliverable directly to a user. An advertising service providing information from a content database for delivery by another service, such as text delivery to an SMS messaging service, is an example of a service used to add value to another. A voice advertising service is an example of a more complete solution, playing a message directly to the user over a mobile phone.

Entertainment 253 services encompass a wide array of services. Entertainment 253 services are targeted to the user, providing functionality designed for fun, not for practical or business use. Entertainment 253 services may include sport scores delivered via SMS messages, horoscopes selected from a mobile portal, as well as video and music delivered to a handset.

Media rights 254 services handle functionality to help ensure digital rights are enforced. This includes Digital Rights Management (DRM) and media based data control services. Services may address the selling, securing and tracking of digital content.

Games entity 255 represents mobile games. Retail 256 entity also includes m-commerce applications. Repurposing 257 applications are generally responsible for the transformation and rendering of information for use on a specific device or by another service. Examples of repurposing are typically the encoding of images from MPEG to GIF, or the transformation of voice into text. Delivery entity 258 addresses applications responsible for the delivery of mobile content or services. Security 259 services may provide authentication, authorization, access control, virtual private networks (VPNs), public key infrastructure (PKI) and other forms of security.

Banking 260 applications may include services to manage a users account, access to bank accounts for automatic payments or electronic payments, and information services such as account balances or loan rates. Healthcare 261 services are generally targeted to the healthcare industry. The services found in this category address the healthcare industry or the health of an individual. Services may include medical dictionary services, health monitoring, notification services for doctors and patients, and emergency services such as ambulance requests or vehicle-to-hospital information exchange.

Merely finding and/or identifying a MES that is an appropriate functional match may not be sufficient. The taxonomy described and shown in FIGS. 2A and 2B provide a system for easily searching for and find such MESs. However, issues such as Quality of Service (QoS), availability, price, and customer satisfaction become important in making an e-service available in a business environment. Consumer expectations should preferably match the supplier services and guarantees as much as possible. Without some common understanding of what is being provided by the vendor and what the consumer wants, the e-service or MES selected may be an inappropriate fit.

Referring again to the UDDI-phonebook analogy, taxonomies are the "yellow pages" providing the category headings to find the services, but do nothing to assist the user in selecting which yellow page entry to select. Identifiers are analogous to the descriptors found in the yellow page ads. For example, while a yellow page search for a computer repair companies may, through the yellow page heading (i.e., the taxonomy) lead a user to find numerous companies, the statements such as, "open 7 days a week," "in business for over 24 years," and the like are the additional relevant information (i.e., the identifiers) that provide the additional information for a user to make the selection.

Furthermore, when searching for an e-service or MES dynamically, at the time of execution, it becomes more important that these decisions be made more programmatically. Embodiments of the present invention preferably include a mechanism to assist the controlling application to find not just a functional e-service, but an appropriate e-service. Identifiers associated at a business level or for each e-service or MES preferably provide the additional level of business information that is useful in making appropriate consumer-supplier matches.

Business level identifiers preferably provide an understanding of the business legitimacy and how the providers of the MES or e-service do business. Identifiers, such as rating (from independent third-parties or customer surveys), revenue model (describing revenue models for purchasing the services, such as licensing, utilization, subscription, and the like), business ID (unique identifiers for various reasons, such as with Dunn & Bradstreet and Thomas Registry), and the like are preferably provided in order to increase the accuracy of MES or e-service selection.

Service level identifiers preferably supply additional service-related information that may be useful in determining the appropriate e-service to invoke. Service identifiers, such as rating (which is also useful in the business level context), revenue model (also from the business level, which supplies the information on the revenue models for the service), localization of service (which allows services to be identified by the language preferences of the user), price of the service, demo or test (indicating whether the service is available for demonstration or testing purposes), and the like.

FIG. 3 is a visual abstraction of a possible classification made according to the teachings of the present invention. In searching for a specific e-service, the information and classification may be organized and implemented as shown in FIG. 3. Classification 30 includes the "address" of the specific service's classification. Each node of each level may preferably use a numeral for level identification. Thus, as shown in classification 30, the e-service would be found at 01-Mobile E-Service, 02-Infrastructure, 04-Service Provider, 06-Gateway, 07-Messaging, and 01-Advertising. The actual use of classification 30 is abstracted in registration code 31. It should be noted that registration code 31 is merely an abstraction of what kind of information may be used by or contained within a UDDI registry. Registration code 31 includes serviceDesignator line 300 that preferably includes classification address 307. Classification address 307 is a short-hand of classifier 30.

In addition to classification address 307, the UDDI registry entry for the example e-service may also preferably include additional information and identifiers such as business identifiers, businessEntity line 301, and service identifiers, businessService line 304. Any number of different identifiers may be used to provide additional information to the e-service users. FIG. 3 depicts registration line 302 for providing registration information. In this example, registration number 308 is associated with registration authority 309, Finnish Trade Registration Number (FTRN). Rating information 303 may also be included in the business identifiers, in which rating 310 is depicted as a code '4.' Similarly, service identifiers, such as revenueModel line 305, which indicates the revenue model under which the service is provided, is LICENSING 311. Service identifiers may also include rating data 306, shown as a code '4' also.

It should be noted that additional business information identifiers, such as identification of parent company, strategic partners, and current customers may also be included. Furthermore, geographic location of the service is generally an important indicator. This will indicate whether a MES or an e-service is relevant to a certain physical location or area. For example, a Finnish tax e-service serving the Helsinki area will not be very useful to a person in Greece. However, if a Greek citizen travels to Helsinki, that e-service becomes a potential candidate for use. Also, if the Finnish taxi service offers a Greek interface, and can be purchased against a Greek bank account. In other embodiments of the present invention, geographic locations may be represented as a separate taxonomy.

FIG. 4 is a flow chart illustrating steps used for searching for a mobile e-services using an embodiment of a taxonomy configured according to one embodiment of the present invention. In step 400, a MES index service configured in a tree structure is accessed. In step 401, a root category of said tree structure is searched for environments compatible with said requesting mobile device. A service category of said tree structure is searched for desired service types in step 402. In step 403, an entity category of said tree structure is searched for desired accessing entity types. A platform category of said tree structure is then searched for desired component platforms in step 404. In step 405, a class category of said tree structure is then searched for desired application characteristics. In step 406, an application category of said tree structure is searched for desired applications to operate on said requesting mobile device. Metadata related to the application category is then searched for additional information relevant to selection of the desired application in step 407.

What is claimed is:

1. A taxonomy accessible by a mobile access device for describing mobile electronic services (MES) comprising:
   a tree structure for organizing descriptive characteristics of said MES, wherein said tree structure includes:
   a root level for identifying an environment to which said MES is directed;
   a service model level for identifying a plurality of service categories;
   an entity level for identifying a plurality of accessing entity categories;
   a platform level for identifying a plurality of available component platforms;
   a class level for identifying a plurality of application characteristics; and
   an application level for identifying a plurality of specific MES applications; and
   metadata for identifying additional information relevant to selection of said MES.

2. The taxonomy of claim 1 wherein said plurality of service categories includes one or more of at least:
   an appliance category;
   an infrastructure category; and
   a service category.

3. The taxonomy of claim 1 wherein said plurality of accessing entity categories includes one or more of at least:
   a user;
   a subscriber;
   an operator;
   a service provider;
   a content provider; and
   a third-party service provider.

4. The taxonomy of claim 1 wherein said plurality of component platforms includes one or more of at least:
   a handset platform, wherein said handset platform further includes one or more of at least:
   an operating system (OS) entity;
   a browser entity; and
   an embedded entity;
   a terminal platform, wherein said terminal platform further includes one or more of at least:
   an OS entity;
   a browser entity; and
   an embedded entity;
   a peripheral platform, wherein said peripheral platform further includes one or more of at least:

an OS entity;
a browser entity; and
an embedded entity;
an access platform;
a gateway platform; and
a portal platform.

5. The taxonomy of claim 1 wherein said metadata includes one or more of at least:
business level identifiers for identifying information regarding a business model of a service provider;
service level identifiers for identifying service-related information relevant to provision of said MES; and
additional information desired by a user in making a selection of said MES.

6. A method for searching for mobile electronic services (MES) to operate on a requesting mobile device comprising:
accessing by said requesting mobile device a MES index service configured in a tree structure;
searching a root category of said tree structure for environments compatible with said requesting mobile device;
searching a service category of said tree structure for desired service types;
searching an entity category of said tree structure for desired accessing entity types;
searching a platform category of said tree structure for desired component platforms;
searching a class category of said tree structure for desired application characteristics;
searching an application category of said tree structure for desired applications to operate on said requesting mobile device; and
searching metadata related to said application category for additional information relevant to selection of said desired application.

7. The method of claim 6 wherein said searching said service category includes:
searching one or more of at least:
an appliance category;
an infrastructure category; and
a service category;
responsive to said service model associated with said desired application.

8. The method of claim 6 wherein said searching said entity category includes:
searching one or more of at least:
a user category;
a subscriber category;
an operator category;
a service provider category;
a content provider category; and
a third-party service provider category;
responsive to said entity category associated with said desired application.

9. The method of claim 6 wherein said searching said platform category includes:
searching one or more of at least:
handset platform nodes;
terminal platform nodes; and
peripheral platform nodes;
responsive to said platform category associated with said desired application.

10. The method of claim 9 wherein said nodes further include one or more of at least:
an operating system (OS) entity;
a browser entity; and
an embedded software entity.

11. The method of claim 9 further comprising:
further searching one or more of at least:
access platform nodes;
gateway platform nodes; and
portal platform nodes.

12. A system for classifying mobile electronic services (MES) comprising:
means for assigning a root designator to an environment compatible with a requesting mobile device;
means for assigning a service designator for desired service types;
means for assigning an entity designator for desired accessing entity types;
means for assigning a platform designator of said tree structure for desired component platforms;
means for assigning a class designator of said tree structure for desired application characteristics;
means for assigning an application designator of said tree structure for desired applications to operate on said requesting mobile device; and
means for assigning metadata related to said application category for additional information relevant to selection of said desired application; and
means for saving said classification in a tree structure accessible by said requesting mobile device.

13. The system of claim 12 wherein said means for assigning said service designator includes:
assigning one or more of at least:
an appliance designator;
an infrastructure designator; and
a service designator;
responsive to said service model associated with said desired application.

14. The system of claim 12 wherein said means for assigning said entity designator includes:
assigning one or more of at least:
a user designator;
a subscriber designator;
an operator designator;
a service provider designator;
a content provider designator; and
a third-party service provider designator;
responsive to said entity designator associated with said desired application.

15. The system of claim 12 wherein said means for assigning said platform designator includes:
assigning one or more of at least:
handset platform designator;
terminal platform designator; and
peripheral platform designator;
responsive to said platform designator associated with said desired application.

16. The system of claim 15 wherein said platform designators further include one or more of at least:
an operating system (OS) entity;
a browser entity; and
an embedded software entity.

17. The system of claim 15 further comprising:
additional means for assigning one or more of at least:
an access platform designator;
a gateway platform designator; and
a portal platform designator.

18. A method for classifying mobile electronic services (MES) comprising:
assigning a root designator to an environment compatible with a requesting mobile device;
assigning a service designator for desired service types;

assigning an entity designator for desired accessing entity types;

assigning a platform designator of said tree structure for desired component platforms;

assigning a class designator of said tree structure for desired application characteristics;

as signing an application designator of said tree structure for desired applications to operate on said requesting mobile device; and assigning metadata related to said application category for additional information relevant to selection of said desired application; and saving said classification in a tree structure accessible by said requesting mobile device.

19. A computer programming product having computer programming logic recorded on an electronic medium, said computer programming logic comprising:

code for assigning a root designator to an environment compatible with a requesting mobile device;

code for assigning a service designator for desired service types;

code for assigning an entity designator for desired accessing entity types;

code for assigning a platform designator of said tree structure for desired component platforms;

code for assigning a class designator of said tree structure for desired application characteristics;

code for assigning an application designator of said tree structure for desired applications to operate on said requesting mobile device; and code for assigning metadata related to said application category for additional information relevant to selection of said desired application; and code for saving said classification in a tree structure accessible by said requesting mobile device.

* * * * *